J. L. LATTA.
VALVE MECHANISM FOR WATER ELEVATORS.
APPLICATION FILED SEPT. 15, 1908.
947,827.
Patented Feb. 1, 1910.
3 SHEETS—SHEET 1.
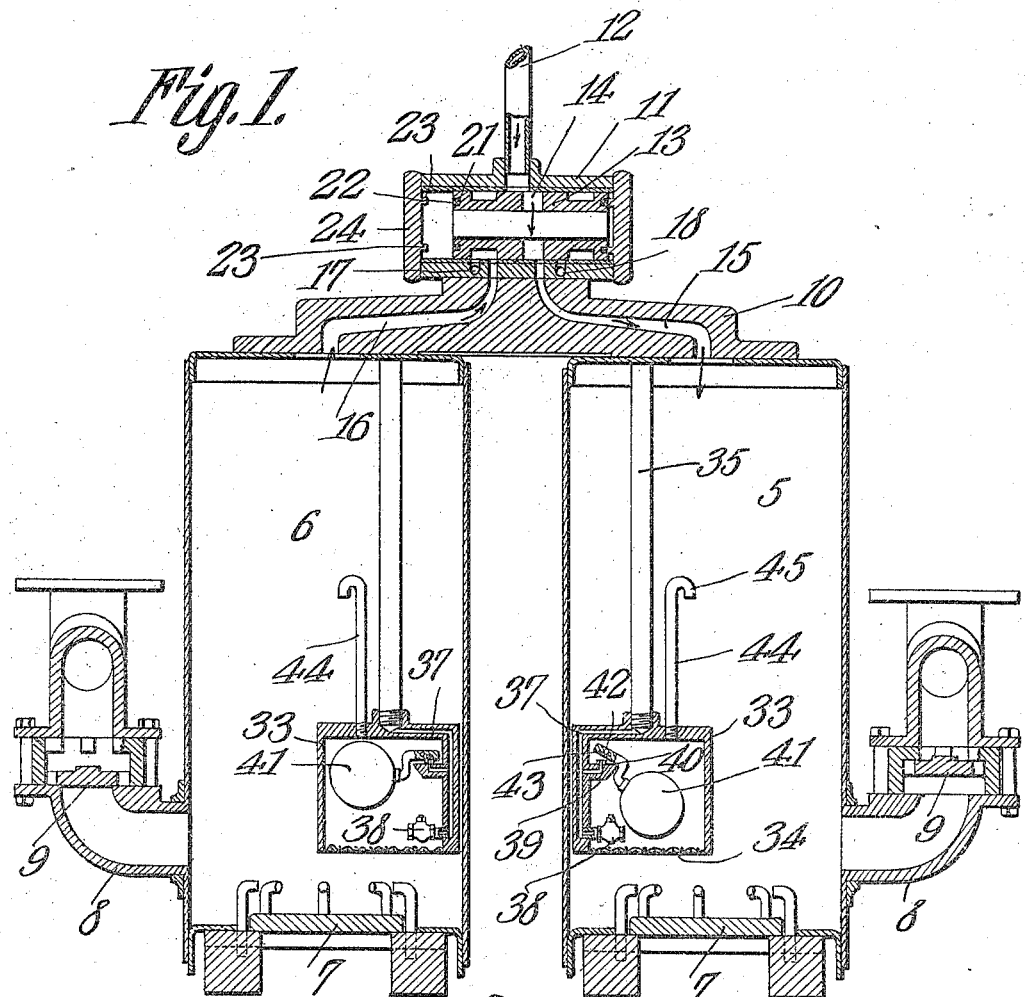
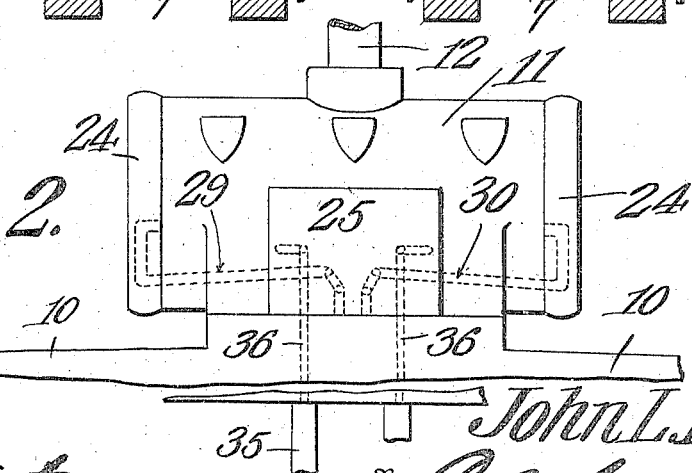
Witnesses
Inventor
John L. Latta.
By
Attorneys J. L. LATTA.
VALVE MECHANISM FOR WATER ELEVATORS.
APPLICATION FILED SEPT. 15, 1908.
947,827.
Patented Feb. 1, 1910.
3 SHEETS—SHEET 2.
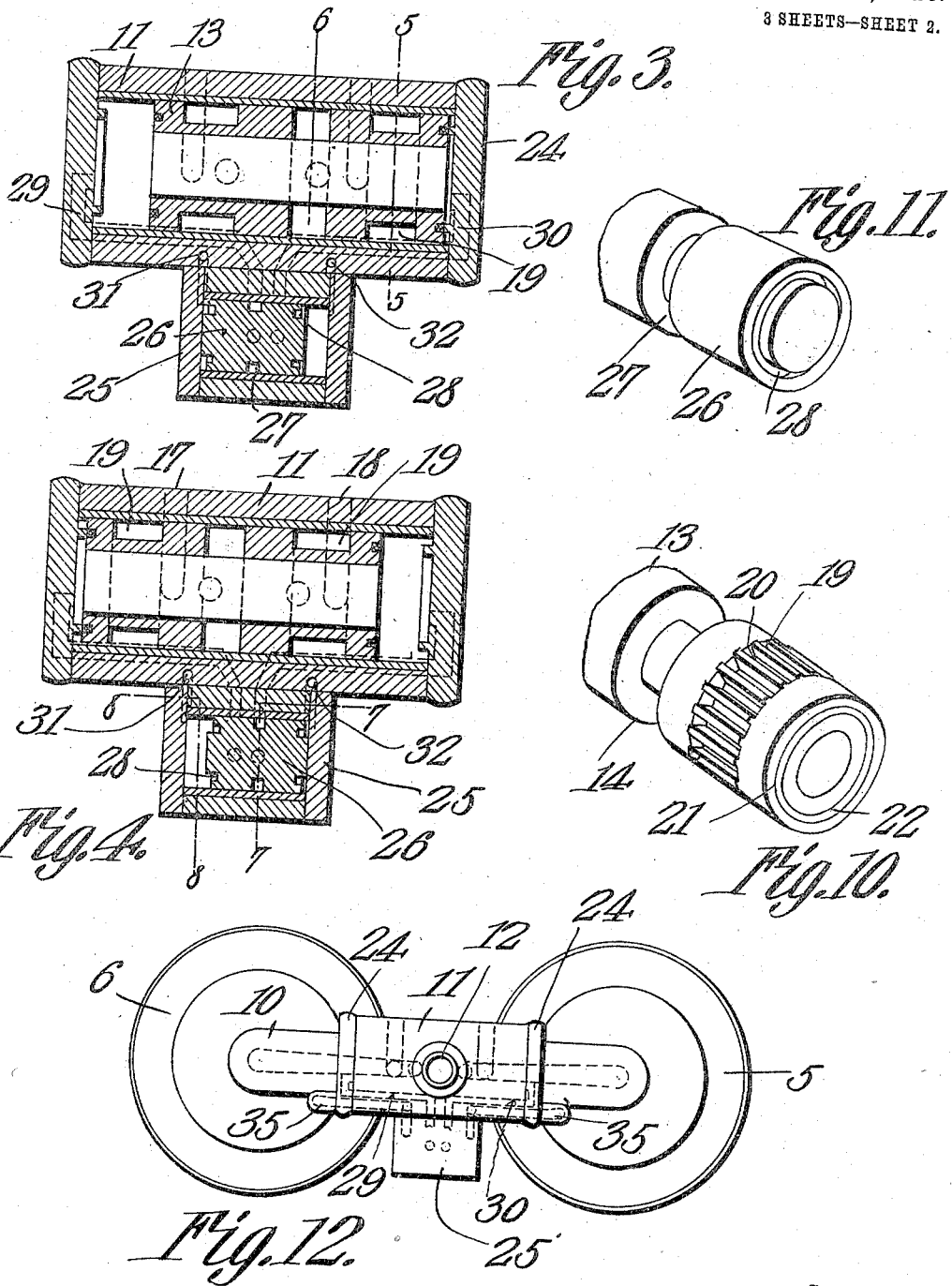
Witnesses
Inventor
John L. Latta.
By
Attorneys

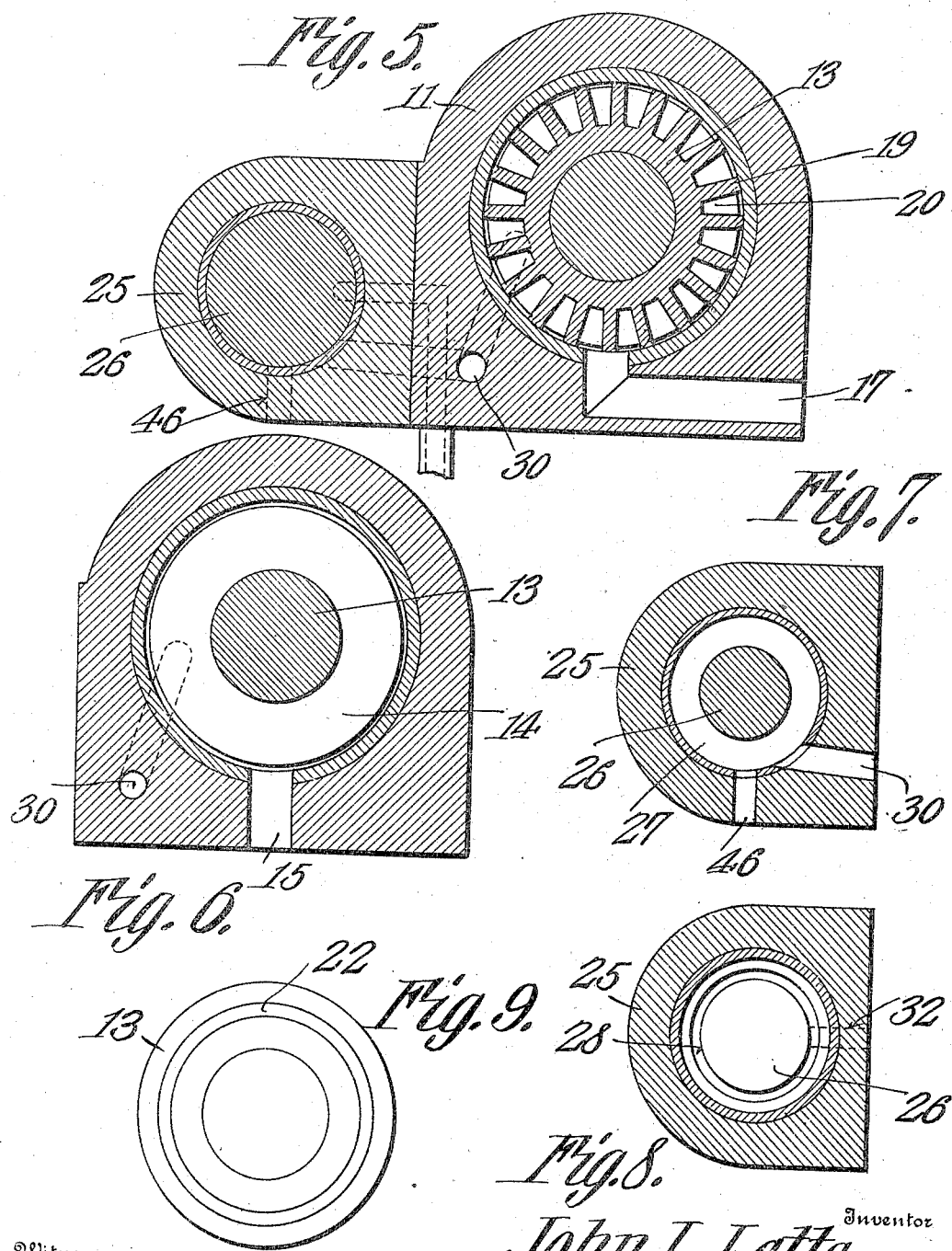

UNITED STATES PATENT OFFICE.

JOHN LEE LATTA, OF HICKORY, NORTH CAROLINA.

VALVE MECHANISM FOR WATER-ELEVATORS.

947,827.  Specification of Letters Patent.  Patented Feb. 1, 1910.

Application filed September 15, 1908. Serial No. 453,114.

*To all whom it may concern:*

Be it known that I, JOHN L. LATTA, a citizen of the United States, residing at Hickory, in the county of Catawba and State of North Carolina, have invented a new and useful Valve Mechanism for Water-Elevators, of which the following is a specification.

This invention relates to valves for compressed air water elevators of that general type in which air under pressure is forced alternately into a pair of liquid containing tanks or cylinders for the purpose of expelling the liquid therefrom.

The object of the invention is to provide a novel form of valve for controlling the admission of air to and the discharge of air from the liquid containing tanks, whereby the efficiency of the device is materially increased.

A further object is to provide an auxiliary valve for controlling the position of the main valve, said auxiliary valve being actuated by the fluid pressure in the liquid containing tanks.

A further object is to provide a pair of float valves movable alternately to establish communication between the interior of the tanks and the auxiliary valve when the liquid is discharged from said tanks.

A still further object of the invention is generally to improve this class of devices so as to increase their utility, durability and efficiency.

Further objects and advantages will appear in the following description, it being understood that various changes in form, proportions and minor details of construction may be resorted to within the scope of the appended claims.

In the accompanying drawings forming a part of this specification:—Figure 1 is a vertical sectional view of a compressed air water elevator showing the improved valve mechanism in connection therewith. Fig. 2 is a side elevation of the main and auxiliary valve casings. Fig. 3 is a horizontal sectional view showing the main valve in position to admit compressed air to one of the tanks. Fig. 4 is a similar view showing the main and auxiliary valves in reversed position. Fig. 5 is a transverse sectional view taken on the line 5—5 of Fig. 3. Fig. 6 is a similar view taken on the line 6—6 of Fig. 3, the auxiliary valve and valve casing being removed. Fig. 7 is a transverse sectional view of the auxiliary valve and casing taken on the line 7—7 of Fig. 4. Fig. 8 is a similar view taken on the line 8—8 of Fig. 4. Fig. 9 is an end elevation of the main valve. Fig. 10 is a detail perspective of one end of the main valve. Fig. 11 is a similar view of one end of the auxiliary valve. Fig. 12 is a top plan view of Fig. 1.

Similar numerals of reference indicate corresponding parts in all of the figures of the drawings.

The device forming the subject matter of the present invention is designed more especially for use in connection with water pumping or elevating devices where compressed air is employed to alternately displace the water from a pair of tanks or cylinders, and in Fig. 1 of the drawings there is shown a compressed air water elevator including a pair of tanks 5 and 6 each provided with a water inlet valve 7 opening under the influence of gravity or external pressure and closing when the air is acting to force the water from the chamber.

Each tank or cylinder is provided with a discharge pipe 8 having a check valve 9 disposed within the same for controlling the flow of fluid from the tanks.

Connecting the upper ends of the tanks 5 and 6 is a casting 10 having a brass lined valve casing or cylinder 11 secured thereto and connected to a suitable source of compressed air supply through the medium of a pipe 12.

Loosely mounted for sliding movement in the casing 11 is a balanced valve 13 having an annular groove or air pocket 14 formed in the central portion thereof and which alternately registers with suitable intake ports 15 and 16 leading to the adjacent water containing tanks and through which air is admitted to the interior of the tanks for the purpose of displacing the water and discharging the same through the pipes 8.

Arranged on one side of the intake ports 15 and 16 are exhaust ports 17 and 18 through which the air from the interior of the tanks 5 and 6 is alternately discharged or exhausted as the main valve travels back and forth in the casing 11.

The opposite ends of the main valve 13 are cut or grooved longitudinally to form a plurality of relatively short webs or partitions 19 defining intermediate ports 20 arranged to span the adjacent inlet and exhaust ports, thereby to form a by-pass to permit the exhaust of compressed air alternately through the ports 17 and 18, in the manner before described.

The webs or partitions 19 bear against and snugly fit the brass lining of the casing 11 at all points so as to prevent the leakage of air over the valve from reaching the exhaust ports 17 and 18 and escaping to the atmosphere.

Each end of the main valve 13 is provided with an annular recess 21 in which is seated a packing of leather or other suitable yieldable material 22, there being an annular rib 23 projecting inwardly from the inner face of each cylinder head 24 and arranged to bear against the adjacent packing 22 as the main valve reciprocates within the valve casing.

Secured to or formed integral with the valve casing 11 is an auxiliary valve casing 25 in which is mounted for sliding movement a closely fitted piston or auxiliary valve 26 for controlling the position of the main valve 13, said auxiliary valve being actuated by the air pressure in the tanks 5 and 6, in the manner hereinafter stated.

The auxiliary valve 26 is provided with an intermediate annular groove or port 27 and terminal annular grooves or ports 28, the intermediate port 27 being adapted to alternately register with suitable exhaust ports or passages 29 and 30 leading to the opposite ends of the main valve 13, while the terminal ports 28 are arranged to register with suitable ports or passages 31 and 32 communicating with the interior of the liquid containing tanks 5 and 6.

Arranged within each liquid containing tank is a hood or housing 33 having its upper end closed and its lower end covered by a strip of wire netting or other foraminous material constituting a screen 34.

The housings 33 are suspended within the liquid containing tanks by pipes 35 each having its lower end threaded in the adjacent housing 33 and its upper end communicating with the ports 31 and 32 through the medium of suitable air passages 36, as best shown in Fig. 2 of the drawing.

Each housing 33 is provided with a port or passage 37, one end of which communicates with the interior of the adjacent pipe 35, while the opposite end thereof opens into the interior of the housing and is provided with an outwardly opening check valve, indicated at 38, the function of which is to permit the exhaust of air from the front of the auxiliary valve 26 into the adjacent housing 33 on each forward and rearward stroke of the auxiliary valve.

Disposed within each housing 33 and communicating with the adjacent port 37 is a nipple 39 having a valve seat 40, which latter, is closed by a float valve 41 when the water in the adjacent tank reaches a predetermined level.

The inner end of each float valve 41 is provided with a recess 42 in which is seated a packing 43 arranged to bear against the valve seat 40 and thus prevent the leakage of air through the passage 37 when the float valve is in closed position.

A pipe 44 is threaded in the upper end of each casing or housing 33 with its upper end extending in the direction of the top of the tank and thence bent downwardly to form a hook 45, the function of this pipe being to admit air under pressure from the upper portion of the tank through the valve 40 to the passage 37 and pipe 35 and thence to the ports 31 and 32, thereby to actuate the auxiliary valve.

The operation of the device is as follows:—The tanks or cylinders 5 and 6 are filled with water or other liquid by gravity or external pressure through the foot valves 7. The main valve 13 being in the position shown in Fig. 1 of the drawings compressed air enters the annular groove or port 14 through the supply pipe 12 and thence passes downwardly through the port or passage 15 into the tank 5, as indicated by the arrows, the air pressure displacing the water or other liquid in said tank and forcing the same through the adjacent discharge pipe 8 to the point of consumption.

As the water in the tank 5 falls below a predetermined level the float 41 will drop by gravity, thereby to expose the valve 40 and establish communication between the interior of the housing 33 and the port 32.

When the float valve is moved to open position a portion of the compressed air in the upper portion of the tank 5 will pass downwardly through the pipe 44 into the housing 33 and thence through the valve 40, pipe 35 and passage 36 to the port 32, thereby moving the auxiliary valve to the position shown in Fig. 3 of the drawing. As the auxiliary valve 26 is actuated by the fluid pressure in the tank 5 the port or groove 27 in said valve will register with the port 29 and thus permit the discharge of air at the rear of the main valve 13 through the port 29, groove 27 and exhaust port 46 to the atmosphere.

The air pressure at the rear of the main valve 11 being thus relieved a portion of the compressed air will leak over the valve 13 to the front head of said valve, thereby forcing the main valve in the opposite direction and causing the packing 22 to bear against the adjacent annular rib or boss 23 on the cylinder head and thereby cut off all leakage through the port 29 which would otherwise escape to the open.

When the main valve is reversed the exhaust port 20 will establish communication between the inlet port 15 and port 18 so as to permit the discharge of air from the tank 5 and permit said tank to be again filled with water. At the same time the groove or port 14 in the main valve will register with the intake 16 and thus allow compressed air to enter the tank 6 and displace the water in said tank, in the manner before described.

As the water in the tank 5 is discharged, liquid enters the tank 6, and vice-versa, so as to permit the continuous operation of the device.

It will here be noted that when the auxiliary valve 26 is moved in either direction the volume of air between the valve head and the adjacent end of the auxiliary valve casing will be forced downwardly through the ports 31 and 32, passage 36, pipe 35 and port 37 to the adjacent check valve 38 and thence be discharged into the interior of the contiguous casing or housing 33, this arrangement of passages affording an outlet for the air which will be displaced when the auxiliary piston or valve 26 is actuated.

It will thus be seen that the auxiliary valve is actuated alternately by the pressure of air in the liquid containing tanks, while said auxiliary valve serves to control the position of the main valve and thus regulate the admission of air into both liquid containing tanks.

The mechanism herein shown and described is comparatively simple in construction and thoroughly practical and efficient in operation, the relative disposition of the several parts being such as to produce a machine of maximum efficiency with a minimum amount of friction and wear on the parts.

Having thus described the invention what is claimed is:—

1. A device of the class described including a plurality of liquid containing tanks, a casing having inlet ports communicating with the interior of the tanks and provided with exhaust ports, a compressed air supply pipe leading to the casing, a main valve operating within the casing for controlling the admission of air into the tanks, an auxiliary valve in communication with the interior of the tanks and actuated by the pressure of the air in said tanks to control the position of the main valve, annular ribs extending inwardly from the opposite ends of the main valve casing, and packing strips carried by the opposite ends of the main valve and arranged to bear against said ribs when the main valve is moved in either direction.

2. A device of the class described including a plurality of liquid containing tanks, a casing having inlet ports in communication with the interior of the tanks and provided with exhaust ports, a compressed air pipe leading to the casing, a main valve operating within the casing and having its opposite ends provided with annular grooves, a packing seated in each groove, and an annular rib projecting inwardly from the opposite ends of the valve casing and arranged to bear against the adjacent packing strip when the valve is moved in either direction.

3. A device of the class described including a plurality of liquid containing tanks, a casing having inlet ports communicating with the interior of the tanks and provided with exhaust ports, a compressed air supply pipe leading to the casing, a main valve operating within the casing, an auxiliary valve, housings suspended within the tanks, passages forming a source of communication between the interior of the housings and the opposite ends of the auxiliary valve, and float valves operating within the housings and operable alternately to cut off the flow of air through said passages to the auxiliary valve.

4. A device of the class described including a plurality of liquid containing tanks, a casing having inlet ports communicating with the interior of the tanks and provided with exhaust ports, a compressed air supply pipe leading to the interior of the casing, a main valve operating within the casing, an auxiliary valve for controlling the position of the main valve, housings suspended within the tanks, passages forming a source of communication between the housings and the opposite ends of the auxiliary valve, air pipes communicating with the interior of the housings and having their upper ends extended in the direction of the top of the tanks and provided with downwardly extending terminals, and float valves operating within the housing for alternately controlling the flow of air from the tanks to the opposite ends of the auxiliary valve.

5. A device of the class described including a plurality of liquid containing tanks, a casing having inlet ports communicating with the interior of the tanks and provided with exhaust ports, a compressed air supply pipe leading to the casing, a main valve operating within the casing, an auxiliary valve for controlling the position of the main valve, housings suspended within the tanks, passages forming a source of communication between the interior of the housings and the opposite ends of the auxiliary valve, float valves operating within the housings for controlling the flow of air to the opposite ends of the auxiliary valve, and a check valve operating within said passages.

In testimony that I claim the foregoing as my own, I have hereto affixed my signature in the presence of two witnesses.

JOHN LEE LATTA.

Witnesses:
N. W. CLARK,
J. C. MARTIN.